US008018492B2

(12) United States Patent
Musunuri et al.

(10) Patent No.: US 8,018,492 B2
(45) Date of Patent: Sep. 13, 2011

(54) VIDEO TESTING USING A TEST PATTERN AND CHECKSUM CALCULATION

(75) Inventors: Chowdhary Musunuri, San Jose, CA (US); Richard T. Wales, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1164 days.

(21) Appl. No.: 11/565,784

(22) Filed: Dec. 1, 2006

(65) Prior Publication Data

US 2008/0129826 A1    Jun. 5, 2008

Related U.S. Application Data

(60) Provisional application No. 60/866,554, filed on Nov. 20, 2006.

(51) Int. Cl.
*H04N 17/00* (2006.01)
*H04N 17/02* (2006.01)
(52) U.S. Cl. ...................................................... 348/192
(58) Field of Classification Search .......... 348/180–194; 714/807, 758
See application file for complete search history.

(56) References Cited

U.S. PATENT DOCUMENTS

| 5,208,666 | A | * | 5/1993 | Elkind et al. | 348/192 |
|---|---|---|---|---|---|
| 6,281,929 | B1 | * | 8/2001 | Fimoff | 348/180 |
| 7,149,954 | B2 | * | 12/2006 | Neuman et al. | 714/807 |
| 2003/0081124 | A1 | * | 5/2003 | Balasubrawmanian et al. | 348/180 |

OTHER PUBLICATIONS

L. Sebaa, A. Ladick, K. Lofgren and D. Cater, "Self-Testable Video Controllers," Published in WESCON/94, 'Idea/Microelectronics,' Conference Record, Anaheim, CA, Sep. 27, 1994-Sep. 29, 1994, pp. 542-546.
James Mears, "Built-In SDV Test Pattern Generation Improves Video System Testing," National Semiconductor, Santa Clara, CA, Apr. 5, 2004. Available online at: http://www.national.com/onlineseminar/2004/sdv/TPG_BIST.pdf.
John F. Snow, "HDTV Video Pattern Generator," Application Note published by Xilinx Inc., San Jose, CA, Mar. 6, 2004.

* cited by examiner

*Primary Examiner* — M. Lee
(74) *Attorney, Agent, or Firm* — Dov Rosenfeld; Inventek

(57) ABSTRACT

A method, an apparatus, and logic for testing a video data path. One method includes sending video data corresponding to a video test pattern to an input port of a video data path; receiving video data at an output port of the video data path; and calculating a function of at least the active part of the received video data. The function is selected such that it has a correct value when the at least the active part of the received video data accurately corresponds to the corresponding part of the sent video data. The method further includes ascertaining whether the function of at least the active part of the received video data has the correct value to ascertain whether or not an error has occurred.

20 Claims, 6 Drawing Sheets

VIDEO TESTING USING A TEST PATTERN AND CHECKSUM CALCULATION

RELATED APPLICATION(S)

The present invention claims priority of, and is a conversion of U.S. Provisional Patent Application No. 60/866,554 filed Nov. 20, 2006 to inventors Musunuri et al. and titled VIDEO TESTING USING A TEST PATTERN AND CHECKSUM CALCULATION. The contents of U.S. Provisional Patent Application No. 60/866,554 are incorporated herein by reference.

FIELD OF THE INVENTION

The present disclosure relates generally to digital video.

BACKGROUND

High definition video leads to data paths that have a pixel clock at or exceeding 74.25 MHz and with digital interfaces such as HDMI interfaces, relatively high data rates are achieved. It is a need for testing video interfaces to detect and isolate hardware problems, if any, such as one or more bits stuck at particular logic levels. Current methods rely on an operator watching video on the monitor and deciding if the video looks good or not. Such methods are prone to operator errors and sometimes may result in single bit or random errors going undetected.

SUMMARY

Embodiments of the present invention include a method, and apparatus, and logic encoded in one or more computer-readable tangible medium to carry out a method. The method is to reliably test video interfaces by using checksum such as CRC techniques.

One particular embodiment includes a method comprising: sending video data corresponding to a video test pattern to an input port of a video data path; receiving video data at an output port of the video data path corresponding to the sent video data; and calculating a function of at least the active part of the received video data. The function selected such that it has a correct value when the at least the active part of the received video data accurately corresponds to the corresponding part of the sent video data, and a value other than the correct value when the at least the active part of the received video differs from the corresponding part of the sent video data. The method further includes ascertaining whether the function of at least the active part of the received video data has the correct value to ascertain whether or not an error has occurred.

In one embodiment of the method, in the case that an error has occurred, the value of the function of at least the active part of the received video data is used to determine the type of error that has occurred.

One particular embodiment includes an apparatus comprising: a digital video data path including an input port and an output port; a test pattern generator with an output coupled to the input port of the video data path, the test pattern generator operative to generate a digital video test pattern; and a function calculator with an input coupled to the output port of the video data path. The function calculator is operative to calculate a function of at least the active part of video data from the data path output port, the function selected such that it has a correct value when the at least the active part of the received video data accurately corresponds to the corresponding part of the video data generated by the test pattern generator, and a value other than the correct value when the at least the active part of the received video differs from the corresponding part of the video data generated by the test pattern generator.

In one embodiment, the apparatus further comprises a memory operative to store the correct value; and a test circuit configured to ascertain whether the function of at least the active part of the video data from the output port of the video data path has the correct value.

In one embodiment, the test circuit is operative to ascertain, in the case an error has occurred, the value of the function of at least the active part of the video data from the output port of the video data path, which is used to determine the type of error that has occurred.

One particular method includes logic encoded in one or more tangible media for execution and when executed operable to: send video data corresponding to a video test pattern to an input port of a video data path; receive video data at an output port of the video data path corresponding to the sent video data; and calculate a function of at least the active part of the received video data. The function is selected such that it has a correct value when the at least the active part of the received video data accurately corresponds to the corresponding part of the sent video data, and a value other than the correct value when the at least the active part of the received video differs from the corresponding part of the sent video data. The logic is further operative when executed to ascertain whether the function of at least the active part of the received video data has the correct value to ascertain whether or not an error has occurred.

In some embodiments, the function is a CRC checksum of the active part of the received video data.

In some embodiments, the video data is high definition video data, and the test pattern is a high definition video test pattern. In one embodiment, the video data is high definition video data, and the test pattern is a high definition video test pattern, and the video data path includes a high definition media interface (HDMI) transmitter and an HDMI receiver.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

BRIEF DESCRIPTION OF THE DRAWINGS

FIG. 3 shows a first test configuration that includes and/or that uses an embodiment of the present invention.

DESCRIPTION OF EXAMPLE EMBODIMENTS

Embodiments of the present invention include a method, and apparatus, and logic encoded in one or more computer-readable tangible medium to carry out a method. The method is to detect one or more hardware failures in a video data path carrying high definition video signals in a video processing system by using built-in test patterns and checksums calculated on video data as a result of test pattern.

Figure 1:
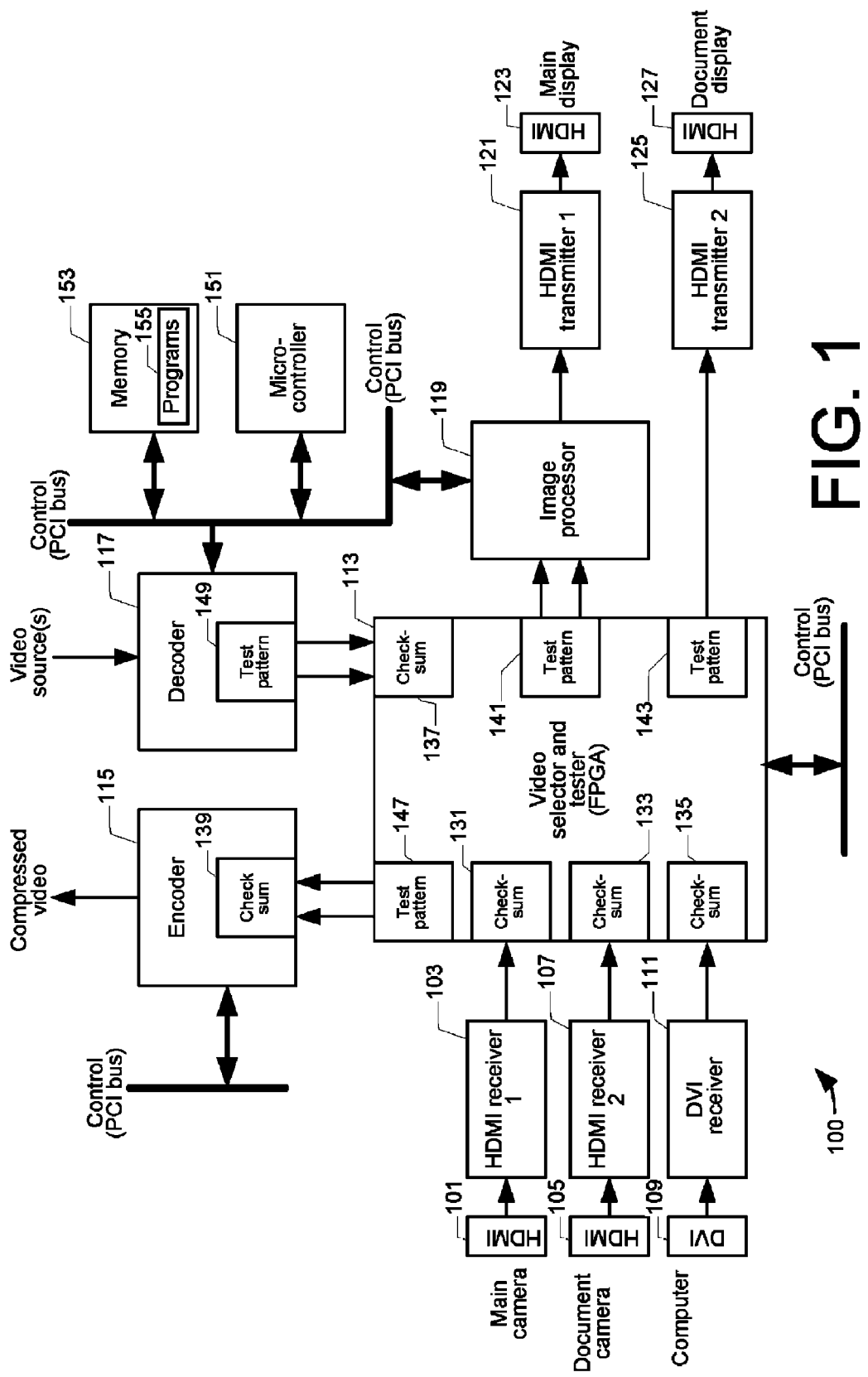
FIG. 1 shows a simple block diagram of an apparatus that includes an embodiment of the present invention.

FIG. 1 shows a simple block diagram of an apparatus 100 that includes an embodiment of the present invention. The apparatus 100 of FIG. 1 is used for video processing in a terminal of a videoconferencing system in which compressed video is sent and received to and from a network, and in which locally generated video is accepted. A display part displays the video corresponding to signals received via the network and signals generated locally, e.g., from one or more cameras. The invention, however, is not limited to such contexts and applications.

In apparatus 100 of FIG. 1, a main camera, a document camera and a computer feed are connected to a first HDMI connector 101, a second HDMI connector 103, and a DVI port, respectively. HDMI (High Definition Multimedia Interface) is a digital video and audio interface specification that was originally designed by a consortium of television manufacturers for dealing with various digital streams, including uncompressed digital HDTV streams. See www.hdmi.org, while DVI (Digital Video Interface) is an older digital video standard. The first HDMI connector 101 is connected to a first HDMI receiver 103 that converts the HDMI serial bit stream to parallel video signals. In one embodiment, the video stream from the main camera is a 16-bit 4:2:2 YUV high definition format that is selectable to be 1080p, 1080i or 720p or some other format. The second HDMI connector 105 from the document camera is connected to a second HDMI receiver 107 that converts the HDMI serial bit stream to parallel video signals that in one embodiment are in 24-bit RGB high definition format that is also is selectable to be 1080p, 1080i or 720p or some other format. Similarly, the DVI input from the computer is via a DVI port 109 and a DVI receiver 111 and produces, in one embodiment, 24-bit RGB video data.

Note that in some embodiments, one or more of the cameras and/or computer sources are in analog form, and in such embodiments, such analog signal(s) is/are digitized.

A video selector and tester unit 113, in one embodiment in the form of an FPGA, is operative to direct various video signals to and from elements of the apparatus. The video selector and tester unit 113 is connected to a PCI bus and controlled from a microcontroller 151 that is connected to the PCI bus.

A memory 153 is shown containing software 155 (shown as "Programs") that is operative when executed by the microcontroller 151, together with the hardware, to carry out embodiments of the present invention. Note that in some embodiments, some of the software 155 may be in a built-in memory in the microcontroller. Furthermore, in some embodiments, a processing system containing one processor or more than one processors may replace the microcontroller.

Note also that in order not to obscure details, various segments of the PCI are shown separately, and furthermore, the bus is shown as a single bus. Those in the art will understand that modern bus subsystems are more complex.

The three video inputs are in one embodiment, directed to a high definition video encoder 115 that encodes the video signals to produce compressed video data to be sent via a network. In one embodiment, two video sources are encoded, the main camera first high definition video source from the first HDMI receiver 103 and a selected one of the second high definition video sources from the second HDMI receiver 107 from the document camera or the video source from the computer. The video encoder 115 is connected to the PCI bus and controlled by the microcontroller that is connected to the PCI bus. There also is output to the PCI bus for reading one or more registers in the encoder.

A video decoder 117 decodes compressed video data, e.g., that arrives from the computer network and transfers two streams of video data to the video selector and tester FPGA 113. In one embodiment, the streams from the decoder 117 are in YUV 4:2:2 format. One of the decoder outputs is a decoded main camera output, and the other a secondary output. The video decoder 117 is connected to the PCI bus and controlled by the microcontroller that is connected to the PCI bus.

In addition to the two streams from the decoder, the FPGA 113 also accepts an input stream from the local main camera via the first HDMI receiver 103 for output to local displays. The video selector and tester FPGA 113 then selects two of the three inputs, e.g., the decoded main camera output and local main camera output from the first HDMI receiver 103, and transfers them to an image processing unit 119 that is operative in conjunction with the FPGA 113 to perform functions such as scaling, rate conversions, picture-in-picture (PIP), picture-on-picture (POP), picture-by-picture (PBP) and on-screen-display (OSD). The image processing unit 119 has a serial interface to a local micro controller (not shown) to implement on-screen display functions. The image processing unit 119 processes the two input streams and combines them with an on-screen display. The output of the image processing unit 119 is forwarded (in one embodiment directly, in another back via the FPGA 113) to a first HDMI transmitter 121 and out to a first HDMI connector 123 to a local display. The decoder also supplies a second video output which is that of either a decoded document camera or a computer source video from the decoder 117.

The image processor 119 is connected to the PCI bus and controlled by the microcontroller 151 that is connected to the PCI bus. Also not shown is the memory used by the image processor 119, e.g., from on-screen display.

In one embodiment, a video input clock is provided with the option of 27 MHz or 74.25 MHz and 480p, 720p or 1080p resolutions.

The apparatus 100 of FIG. 1 provides several alternate video data paths with several different entry points, called input ports, and several output points, called output ports. There is, for example, a video data path from the FPGA 113 to the video encoder. There also is a path from any of the HDMI connectors to the FPGA 113. There also is a path from main camera HDMI connector 101 the first HDMI output connector 123. By use of HDMI cables from HDMI output connectors to one or another HDMI input connector, there also is a data path from the decoder via the FPGA, via the image processor 119, via the first output HDMI connector via the first HDMI input connector, and back to the FPGA 113. Thus, those in the art will appreciate that the apparatus of FIG. 1 shows several alternate video data paths, each having an input video port and an output video port. The FPGA is able under control of the microcontroller to switch video paths and also change the video properties.

Figure 2:
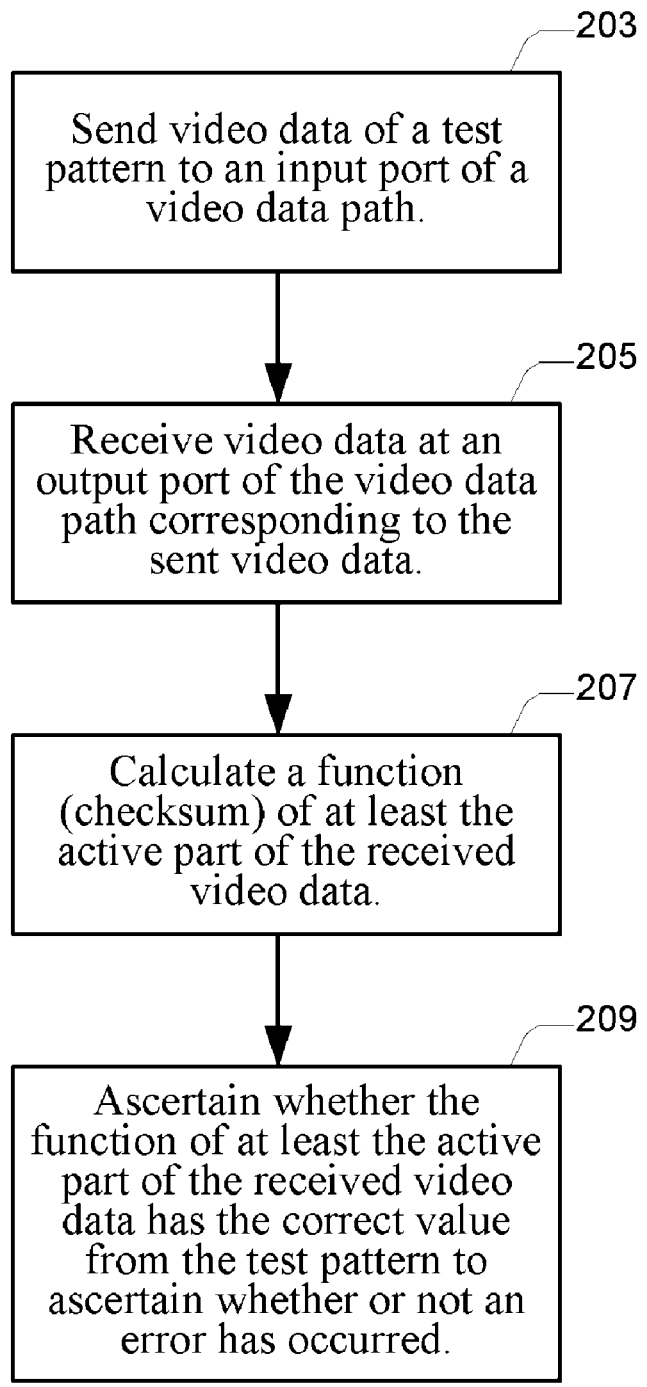
FIG. 2 shows a flowchart of one method embodiment of the present invention.

FIG. 2 shows a flowchart of a method embodiment of the present invention. The method includes in 203, sending video data corresponding to a video test pattern to an input port of a video data path and in 205 receiving video data at an output port of the video data path corresponding to the sent video data. The method further includes in 207 calculating a function of at least the active part of the received video data. The function is selected such that it has a correct value when the at least the active part of the received video data accurately corresponds to the corresponding part of the sent video data, and a value other than the correct value when the at least the active part of the received video differs from the corresponding part of the sent video data. The method further includes in 209 ascertaining whether the function of at least the active part of the received video data has the correct value to ascertain whether or not an error has occurred.

In one embodiment, the method is such that, in the case that an error has occurred, the value of the function of at least the active part of the received video data is used to determine the type of error that has occurred.

In one embodiment, the function is a CRC checksum of the active part of the received video data. In one embodiment, the CRC checksum is a 32-bit CRC.

In one embodiment, the video data is high definition video data, and the test pattern is a high definition video test pattern. In one embodiment, the video data is high definition video data, and the test pattern is a high definition video test pattern, and the video data path includes an HDMI transmitter and an HDMI receiver.

Figure 6:
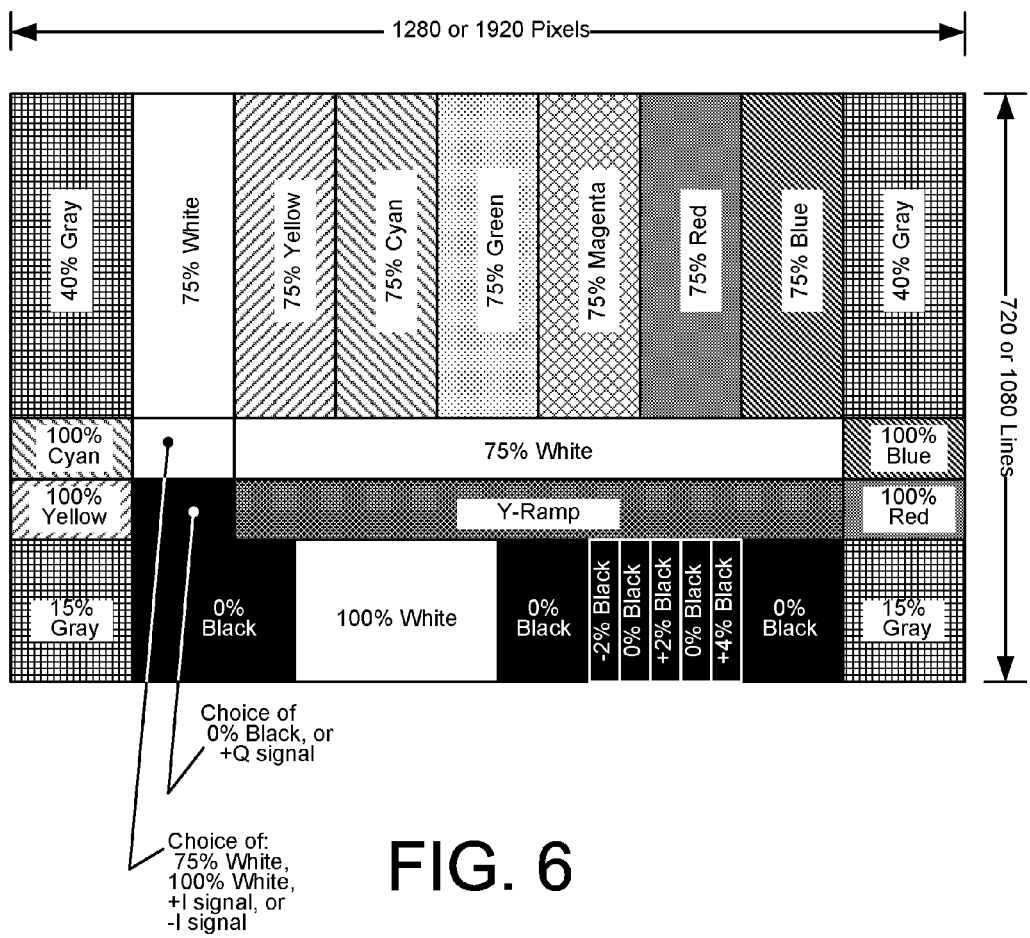
FIG. 6 shows a black and white representation of an RP219-compliant test pattern.

In one embodiment, the test pattern is selected to include a set of different shades of luminance and chrominance such that all bits of the signal path for the video data are tested. In one embodiment, the test includes 4:2:2 formatted video. In one embodiment, the video includes 16-bit YC (YUV) information. In one embodiment, the video includes 24-bit RGB information. One test pattern is as defined by the SMPTE RP219 specification, in particular SMPTE RP 219-2002 titled "High-Definition, Standard-Definition Compatible Color Bar Signal" that specifies a color bar pattern compatible with both high- and standard-definition environments. The multi-format color bar signal is originated as an HDTV signal with an aspect ratio of 16:9 and may be down converted to a standard definition TV color bar signal with an aspect ratio of either 4:3 or 16:9. FIG. 6 shows a black and white representation of an RP219-compliant test pattern.

Method embodiments of the invention can be used to test video interfaces between the HDMI receivers and the encoder and between decoder and HDMI transmitter. Board level HDMI connectors and HDMI receivers and transmitters can be tested by using one or more external HDMI cables, e.g., loopback between input and output connectors. The method can also be used to test two circuit boards at the same time, each with each board including an instance of an apparatus such as shown in FIG. 1, by using external HDMI cables between the different boards.

As shown in FIG. 1, in one embodiment of the apparatus 100, the decoder 117 includes a test pattern generator 149 to generate a test pattern. There are two connections into the decoder, a primary video connection and a secondary video connection, each from the decoder to the video selector and tester FPGA 113. A connection to the PCI bus is included, and control of the decoder 117 is via the PCI bus and can select the test pattern to be sent to one or another of the video connections.

As shown in FIG. 1, in one embodiment, the encoder 115 includes a checksum calculator 139 whose operation is controlled by a connection to the PCI bus. There are two video connections into the encoder, a primary video connection and a secondary video connection, each from the video selector and tester FPGA 113 to the encoder 115. The checksum results are readable at the microcontroller 151 via the PCI bus.

As shown in FIG. 1, in one embodiment, the video selector and tester FPGA 113 includes a first test pattern generator 141 and a second test pattern generator 143, each independently operable to generate a test pattern, and controllable via a connection to the PCI bus. The output of the test pattern generator 141 can be selected by the microcontroller via the PCI bus to be routed via the image processor 119 to the first HDMI transmitter 121 and first HDMI output connector 123. The output of the second test pattern generator 143 can be selected to be routed to the second HDMI transmitter 125 and first HDMI output connector 127.

As shown in FIG. 1, in one embodiment, the video selector and tester FPGA 113 includes a first checksum calculator 131 and a second checksum calculator 133, each independently operable to calculate a 32 bit checksum of a video signal. The checksum calculators 131 and 133 are controllable via the PCI bus, and their results are readable in registers coupled to the PCI bus. The video selector and tester FPGA 113 is operable so that the first checksum calculator 131 calculates the output of the first HDMI receiver 103, and so that the second checksum calculator 133 calculates the output of the second HDMI receiver 107.

One embodiment of apparatus 100 includes a third checksum calculator 135 for the DVI input. In one embodiment, the checksum calculators can be switched to calculate one or the other of the decoder outputs, and the test pattern generators can be switched to output to one or the other inputs of the encoder. In an alternate embodiment, than that shown in FIG. 1, there is at least one additional test pattern generator 147 operable to generate a test pattern for input to one or the other encoder inputs, and there is at least one additional checksum calculator 137 operable to accept video from one or the other inputs of the decoder and calculate a checksum.

One embodiment of apparatus 100 uses 16-bit datapaths, and 16-bit registers in the video selector and tester FPGA 113. The CRC value itself is a 32-bit value broken into two 16-bit values: the upper and lower 16 bits for 16-bit internal registers of the video selector and tester FPGA 113. In an alternate embodiment, 32-bit registers are used for each checksum.

The main and auxiliary CRC values can differ. In one implementation, although the test pattern itself is fixed and known, the main video path goes through the image processor 119 that includes image scaling that scales the input video and hence, in the process, alters the expected pattern bits in a known fixed way. Hence, the resulting checksum—the correct CRC value—would be different.

Figure 3:
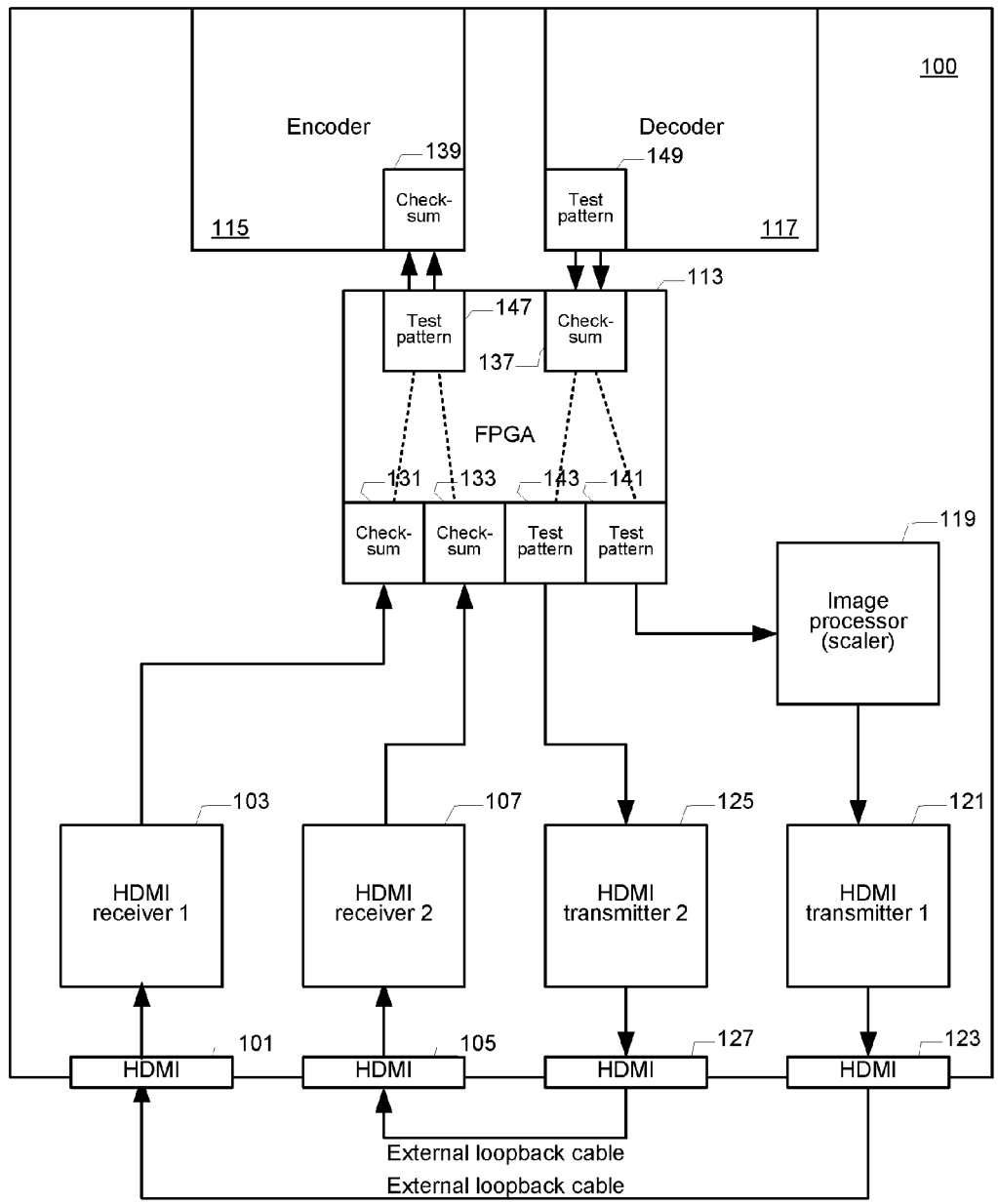
FIG. 3 shows a first test configuration for an instance of an apparatus that includes an embodiment of the present invention.

FIG. 3 shows a first test configuration for an instance of apparatus 100 that includes using HDMI loop-back cables and that is operable to test the integrity of a plurality of video datapaths using the method shown in FIG. 2. Note that that layout of the various components of FIG. 1 is shown located differently in order to better illustrate the configuration. Also, various elements, e.g., the PCI bus connections, are not shown in order not to obscure the important aspects.

In the test illustrated in the configuration of FIG. 3, the microcontroller is programmed to set up the decoder 117's test pattern generator 149 to send out a test pattern on the primary and secondary video connections to the video selector and tester FPGA 113. The microcontroller 151 is programmed to set up the checksum calculator(s) 137 to compute the checksum on the test pattern coming from the decoder 117's primary and secondary connections. This checks the integrity of the connections between the decoder and the FPGA 113.

In one embodiment, in the case the checksums are OK, the video selector and tester FPGA 113 forwards out the test pattern to both the main and auxiliary HDMI output connectors, in order to also test the main and auxiliary HDMI connections.

The microcontroller 151 is programmed to set up the pattern generators 141 and 143 to generate test patterns out to the HDMI transmitters 121 and 125, and HDMI connectors 123 and 127 to test the main and auxiliary HDMI connections.

For this, a HDMI to HDMI cable is added to connect the main HDMI output 123 to the main HDMI input 101, and a HDMI to HDMI cable is added to connect the second (auxiliary) HDMI output 127 to the second (auxiliary) HDMI input 105.

The microcontroller 151 is programmed to set up the video selector and tester FPGA 113's checksum calculators 131 and 133 to compute the checksum on data received via the first and second HDMI receivers 103 and 107, respectively. This ensures that the main input connectors and main output connectors are functioning, and also that the second (auxiliary) input connectors and second output connectors are functioning correctly.

In one embodiment, in the case checksums are OK, the microcontroller 151 is programmed to set up the video selector and tester FPGA 113 to forward the test pattern back to the decoder 115 on the primary and secondary decoder video connections in order to test these connections to the decoder 115.

In an alternate embodiment, the microcontroller 151 is programmed to set up the video selector and tester FPGA 113's test pattern generator 147 to the generate a test pattern to the primary and secondary decoder video connections in order to test these connections to the decoder 115.

The microcontroller 151 is programmed to set up the decoder 115 to compute checksum on the video it receives on its primary and secondary input connections. This checks the integrity of these input decoder connections.

Thus, by using two HDMI cables, the connections from the decoder 117 to the FPGA 113 are tested, the connections from the FPGA 113 out to the HDMI output connectors and back through the HDMI input connectors to the FPGA 113 are tested, and the connections from the FPGA to the encoder are tested.

Figure 4:
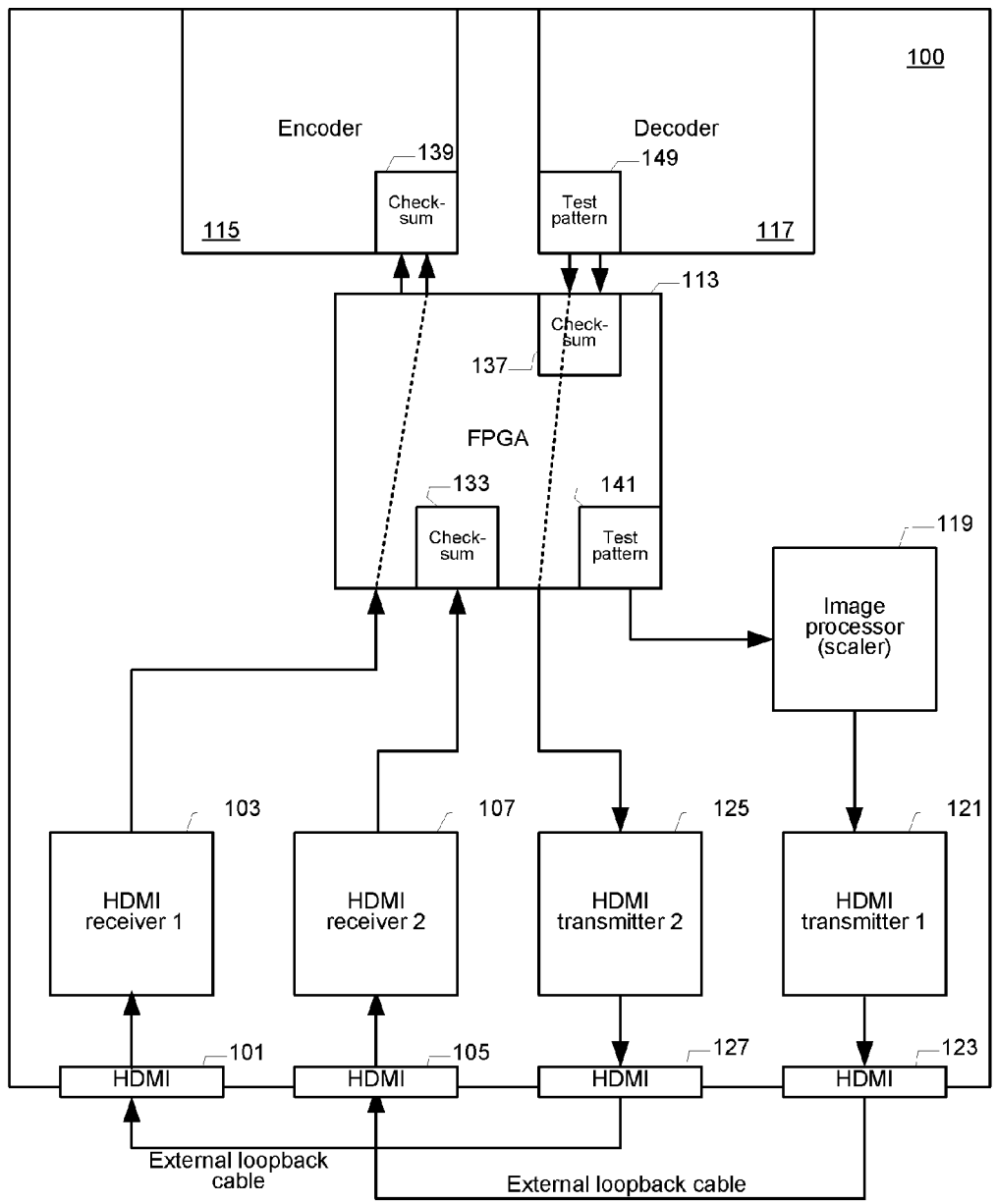
FIG. 4 shows a second test configuration that includes and/or that uses an embodiment of the present invention.

FIG. 4 shows an alternate arrangement for testing a plurality of video datapaths in the apparatus 100, each test of a datapath according to the method described above and in FIG. 2. In this arrangement, the microcontroller 151 is programmed to set up the decoder 117's test pattern generator 149 to send out a test pattern on its primary and secondary video backplane to the video selector and tester FPGA 113. The microcontroller 151 is programmed to set up the checksum calculator(s) 137 to compute the checksum on the test pattern coming from the decoder 117's primary connection, but not the secondary connection. This checks the integrity of the primary connection between the decoder and the FPGA 113.

The microcontroller 151 is programmed to set up the video selector and tester FPGA 113 to forward the test pattern from the secondary connection to the second (auxiliary) HDMI output connector. In one embodiment, if the checksum is OK, the microcontroller 151 is programmed to set up the video selector and tester FPGA 113 to forward the test pattern to the main HDMI output connector, or in an alternate embodiment, the microcontroller 151 is programmed to set up the pattern generator 141 to generate a test pattern out to the main HDMI transmitter 121.

A HDMI to HDMI cable is added to connect the main HDMI output 123 to the second (auxiliary) HDMI input 105 and a HDMI to HDMI cable is added to connect the second (auxiliary) HDMI output 127 to the first (main) HDMI input 101.

The microcontroller 151 is programmed to set up the video selector and tester FPGA to forward the received video from the first (main) HDMI receiver 103 to the primary video connection to the encoder, and also to set up the FPGA's second checksum calculator 133 on the auxiliary connection from the second HDMI receiver 107 to check the integrity of the video datapath from the main output HDMI connector via the second HDMI receiver 107 to the FPGA. In one embodiment, if the checksum is OK, the microcontroller 151 is programmed to set up the video selector and tester FPGA 113 to forward the test pattern to the secondary video connection to the encoder 115. In an alternate embodiment, the microcontroller 151 is programmed to set up the pattern generators 147 to generate a test pattern out to the secondary encoder 115 input.

The microcontroller 151 is programmed to set up the decoder 115's checksum calculator 139 to compute the checksum on video the encoder 115 receives on both its primary and secondary input connections.

Those in the art will understand that other configurations are possible to test one or more of the datapaths in the video system 100.

Another ser of arrangements includes connecting two units such as unit 100 together using external HDMI cables, and using the built-in test pattern generator(s) and built-in checksum calculator(s) to test datapaths through more than one unit.

Figure 5:
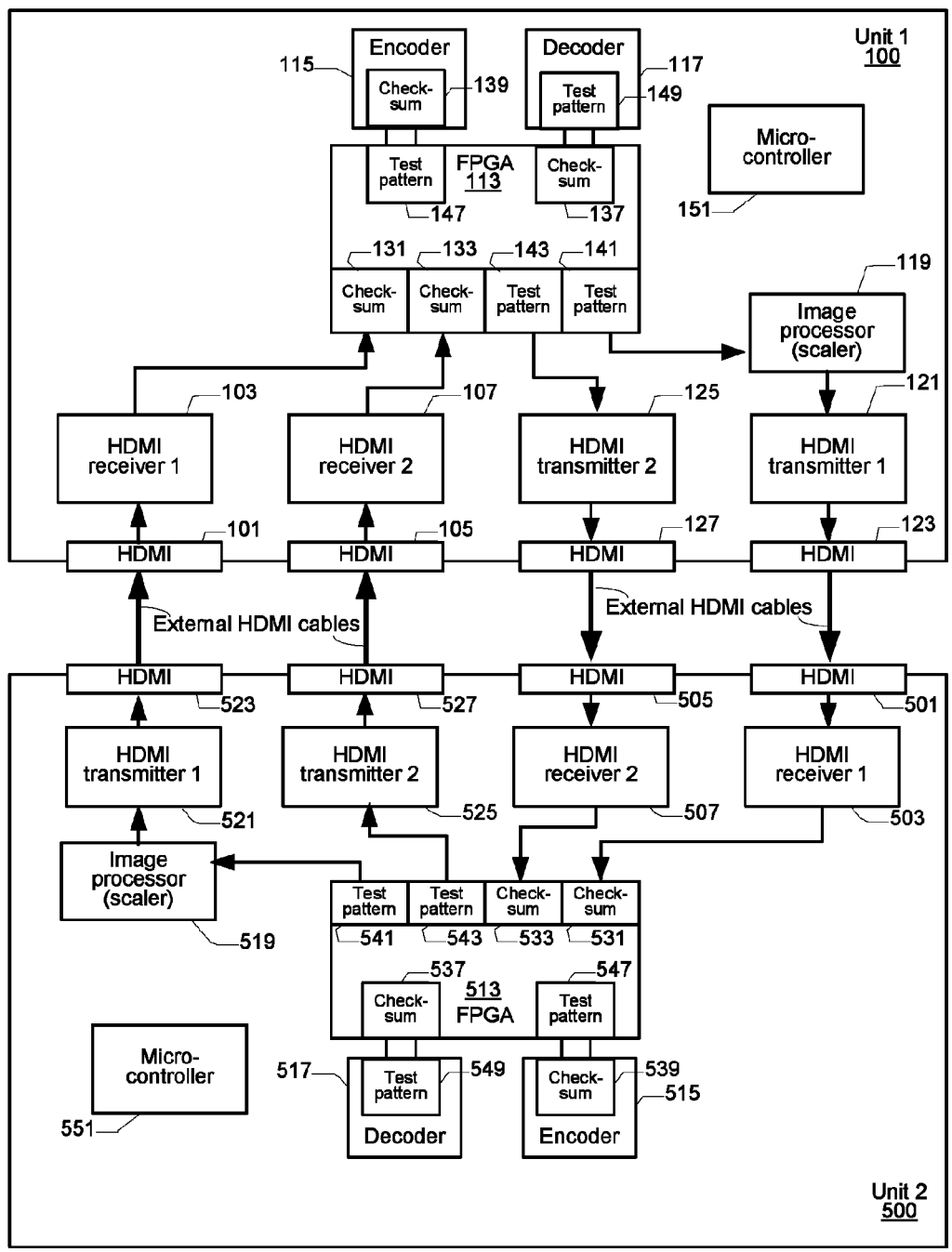
FIG. 5 shows a third test configuration that includes and/or that uses an embodiment of the present invention.

FIG. 5 shows one such embodiment using a first unit 100 and a second unit 500, each a separate instance of the system shown in FIG. 1. For simplicity, some of the elements, e.g., bus connections, are not shown. Thus, as described above for unit 100, unit 500 includes first and second HDMI input connectors 501 and 505, first and second HDMI transmitters 521 and 525, a video selector and tester FPGA 513 that includes, in one embodiment, a plurality of test pattern generators 541, 543 and 547, and a plurality of checksum calculators 531, 533, 535 and 537. The unit 500 also includes an image processor 519 that, e.g., is operative to scale an image from the FPGA. Also included are an encoder 515 having a primary and secondary connection from the FPGA 513, and a decoder 517 having a primary and secondary connection to the FPGA 513. The encoder includes a checksum calculator 539, and the decoder includes a test pattern generator 549. The unit is controlled by a microcontroller 551.

In one test configuration, the microcontroller 551 is programmed to set up the decoder 517's test pattern generator 549 to send out a test pattern on the primary and secondary connection to the FPGA 513. The microcontroller sets up the checksum calculators on the FPGA 513 to check out the checksums, and then forwards the test pattern if the checksum is OK, or use the FPGA's internal test pattern generators 541, 543 to set up test patterns on the main and auxiliary HDMI output connectors 523 and 527 of unit 100.

In another embodiment, the decoder is not used and the test is set up by the microcontroller 551 setting up the FPGA's internal test pattern generators 541, 543 to set up test patterns on the main and auxiliary HDMI output connectors 523 and 527 of unit 500.

External HDMI to HDMI video cables are used to connect the main and auxiliary output connector 523 and 527 of unit 500 to the main and auxiliary input connectors 501 and 505, respectively, of unit 500.

The microcontroller 551 of unit 500 sets up the video selector and tester FPGA 513's checksum calculators 531 and 533 to compute the checksum on data it receives on the main and auxiliary inputs from the HDMI receivers 503 and 507.

The microcontroller 551 of unit 500 sets up the video selector and tester FPGA 513 such that both its checksums are correct, the video selector and tester FPGA 513 forwards out the test pattern to both the first and second HDMI transmitters 521 and 525 and then to the main and auxiliary HDMI output connectors 523 and 527.

External HDMI to HDMI video cables are used to connect the main and auxiliary output connector 523 and 527 of the second unit 500 to the main and auxiliary input connectors 101 and 105, respectively, of the first unit 100.

The microcontroller 151 of unit 100 sets up the video selector and tester FPGA 113's checksum calculators 131 and 133 to compute the checksum on data it receives on the main and auxiliary inputs from the HDMI receivers 103 and 107. In this manner, several video datapaths that include video datapaths in each of unit 100 and unit 500, including HDMI connectors, are tested.

Other configurations using two or even more than two units such as unit 100 are possible as would be clear to those in the art. For example, the external cables can be connected to connect the main HDMI output connector to the other unit's auxiliary HDMI input connector, and so forth.

In one embodiment, the video selector and tester FPGA 113 registers are 16-bits in length, and the CRC is 32 bits. Table 1 below describes some of the registers of the CRC calculator (the video selector and tester FPGA 113), their description, and the expected values of the 32-bit CRC for the SMPTE RP 219 test signal used in one embodiment when the image processor is set up for scaling.

TABLE 1

| Register addr. | Contents | Expectd value |
|---|---|---|
| 0xc0 | Upper 16 bits of main input 32-bit CRC | 0x1e7a |
| 0xc4 | Lower 16 bits of main input 32-bit CRC | 0xd6a8 |
| 0xcc | Upper 16 bits of auxiliary input 32-bit CRC | 0xdc13 |
| 0xd0 | Lower 16 bits of auxiliary input 32-bit CRC | 0xc9a7. |
| 0xd8 | Upper 16 bits of decoder 117 primary out 32-bit CRC | 0x9ed1 |
| 0xdc | Lower 16 bits of decoder 117 primary out 32-bit CRC | 0x29f5 |
| 0xe4 | Upper 16 bits of decoder 117 secondary out 32-bit CRC | 0x9ed1 |
| 0xe8 | Upper 16 bits of decoder 117 secondary out 32-bit CRC | 0x29f5 |

In more detail, embodiments of the present invention are concerned with the video part of signals that come via an HDMI connector. For video, the HDMI interface provides four digital signals each as a transition minimized differential signaling (TMDS) pair providing serial data. The four signals are a clock signal and one each of three pixel encodings (the color components). The HDMI interface supports: RGB 4:4:4, YCbCr 4:4:4 (8-16 bits per component); YCbCr 4:2:2 (12 bits per component). In one implementation of the present invention, RGB 4:4:4 with 10 bits per color is used, at a clock rate of 745 Mbits/sec.

Each HDMI receiver is a device (or software) whose function is to de-multiplex the signals, e.g., convert serial data to parallel data, and, for the purpose of video, provide four multi-bit signals, e.g., 10-bit signals, one for the clock and one for each of the three colors, e.g., R, G, and B. An HDMI transmitter multiplexes four multi bit signals to produce the differential serial streams according to the HDMI specification.

According to the HDMI specifications, there are special word sequences of one or more words that indicate particular synchronization events in a video sequence. Typically, these are three to four words long. For each video line, there is a horizontal sync code to indicate the start of a line, blanking level to indicate the blanking part of a line, a start of active line code to indicate the start of an active line, and an end of active line code to indicate the end of the active line. In some implementations, there also is a codeword to indicate the end of a frame, and a codeword to indicate the beginning of a frame.

Each checksum calculator implements a method that extracts only the active pixel data of each line, and calculates the checksum of all the active parts of all lines in a frame. The method includes searching for a start of frame codeword or codewords, then if found, until an end of frame is found, searching for a horizontal sync codeword, and if found, until an end of line codeword, searching for a start of active region codeword, and if found, accumulating checksum until the end of active line.

In one embodiment, a single checksum is determined for all colors. The checksum is calculated in a manner, e.g., an ordering, such that when the checksum is incorrect, indicating a failure, the particular value indicates which of the R, G, or B video signals was in error, and also whether the error was that the value is stuck at high or low in the serial digital line, e.g., the HDMI signal. In the case of YUV signals, in one embodiment, the checksum is calculated in a manner, e.g., an ordering, such that when the checksum is incorrect, indicating a failure, the particular value indicates which of the Y, U, or V video signals was in error, and also whether the error was that the value is stuck at high or low in the serial digital line, e.g., the HDMI signal.

Thus embodiments have been described for carrying out tests of video datapaths using a built-in test pattern generator and a built-in checksum calculator that uses every active pixel in a picture for the checksum.

Unless specifically stated otherwise, as apparent from the following discussions, it is appreciated that throughout the specification discussions utilizing terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) logic encoded on one or more computer-readable media containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries logic (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium on which is encoded logic, e.g., in the form of instructions.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the logic including instructions, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that are for execution on one or more processors, e.g., one or more processors that are part of a video unit used in a video teleconferencing terminal. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries logic including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an example embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to include, but not be limited to, solid-state memories, a computer product embodied in optical and magnetic media, a medium bearing a propagated signal detectable by at least one processor of one or more processors and representing a set of instructions that when executed implement a method, a carrier wave bearing a propagated signal detectable by at least one processor of the one or more processors and representing the set of instructions a propagated signal and representing the set of instructions, and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

It should further be appreciated that although the invention has been described in the context of HDMI terminals, receivers and transmitters, the invention is not limited to such contexts and may be utilized in various other applications and systems, for example in a system that uses other types of interfaces for high definition video streams.

Furthermore, while 32-bit CRCs were used for the checksum calculation, any function of the pixel data that can detect an error may be used. Furthermore, while one embodiment used a common SPMTE test pattern, the invention is not limited to using such test pattern, and in different embodiments, different test patterns may be used.

All publications, patents, and patent applications cited herein are hereby incorporated by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method comprising:
sending video data corresponding to a video test pattern to an input port of a video data path, wherein the video data path does not cause the video data to undergo a transform compression or decompression or any other processing that is lossy, lossy processing being processing that would cause at least an active part of the video data at the output port to not be an exact duplicate of the corresponding at least the active part of the sent video data because of losses inherent in processing in the video data path;
receiving video data at an output port of the video data path corresponding to the sent video data, the output;
calculating a function of at least an active part of the received video data, the function selected such that it has a correct value when the at least the active part of the received video data accurately corresponds to the corresponding part of the sent video data, and a value other than the correct value when the at least the active part of the received video differs from the corresponding part of the sent video data; and
ascertaining whether the function of at least the active part of the received video data has the correct value to ascertain whether or not an error has occurred such that the video data path can be tested.

2. A method as recited in claim 1, wherein, in the case that an error has occurred, the value of the function of the at least the active part of the received video data is used to determine the type of error that has occurred.

3. A method as recited in claim 1, wherein the function is a CRC checksum of the active part of the received video data.

4. A method as recited in claim 1, wherein the video data path is one of a set of one or more video data paths, each having a corresponding input port and output port, the video paths being in an apparatus that includes at least one of:
a video coder having a video coder input, wherein the output port of one of the set of one or more video data paths in normal operation is coupled to the video coder input and additionally or alternately can be used for the calculating of the function,
a video decoder having a video decoder output that in normal operation is coupled to one of the set of test pattern generators, arranged such that the input port of the video data path whose input is coupled to the video decoder output in normal operation additionally or alternately has sent therein the video data of the video test pattern,
a video receiver having a video receiver output and being in one of the set of one or more video data paths whose input port can be the input port to which the video data corresponding to the video test pattern is sent, and whose output port output is used for the calculating, and
a video transmitter having a corresponding video transmitter input and being in one of the set of one or more video data paths whose input port can be the input port to which the video data corresponding to the video test pattern is sent, and whose output port output is used for the calculating.

5. A method as recited in claim 1, wherein the video data path includes an HDMI transmitter, where HDMI refers to High Definition Media Interface, and an HDMI receiver.

6. An apparatus comprising:
a digital video data path including an input port configured to accept input digital video data and an output port configured to accept output digital video data, wherein the video data path does not cause the input digital video data to undergo a transform compression or decompression or any other processing that is lossy, lossy processing being processing that would cause at least an active part of the output digital video data at the output port to not be an exact duplicate of the corresponding at least the active part of the sent video data because of losses inherent in processing in the video data path;
a test pattern generator with an output coupled to the input port of the video data path, the test pattern generator operative to generate a digital video test pattern; and
a function calculator with an input coupled to the output port of the video data path, the function calculator being operative to calculate a function of at least an active part of video data from the data path output port, the function selected such that it has a correct value when the at least the active part of the received video data accurately corresponds to the corresponding part of the video data generated by the test pattern generator, and a value other than the correct value when the at least the active part of the received video differs from the corresponding part of the video data generated by the test pattern generator,
wherein the video data is high definition video data, and the test pattern is a high definition video test pattern,
such that the digital video data path can be tested.

7. An apparatus as recited in claim 6, further comprising:
a memory operative to store the correct value; and
a test circuit configured to ascertain whether the function of the at least the active part of the video data from the output port of the video data path has the correct value.

8. An apparatus as recited in claim 7, wherein the test circuit is operative to ascertain, in the case that an error has occurred, the value of the function of the at least the active part of the video data from the output port of the video data path, which is used to determine the type of error that has occurred.

9. An apparatus as recited in claim 6, wherein the function is a CRC checksum of the active part of the received video data.

10. An apparatus as recited in claim 6,
wherein the test pattern generator is one of a set of one or more test pattern generators, each having a corresponding test pattern generator output,
wherein the video data path is one of a set of one or more video data paths, each having a corresponding input port and output port,
wherein the function calculator is one of a set of one or more function calculators each having a corresponding function calculator input,
wherein the apparatus includes at least one of:
a video coder having a video coder input and including or coupled to one of the set of function calculators, the output port of one of the set of one or more video data paths switchably coupled to the video coder input and the input of function calculator in or coupled to the function calculator,
a video decoder having a video decoder output and including or coupled to one of the set of test pattern generators, the video decoder output and the test pattern generator output of the test pattern generator in or coupled to the video decoder and being switchably coupled to the input port of one of the set of one or more video data paths,
a video receiver having a video receiver output and being in one of the set of one or more video data paths whose input port can be coupled to the output of one of the set of test pattern generators and whose output port can be coupled to the input of one of the set of function calculators, and
a video transmitter having a corresponding video transmitter input and being in one of the set of one or more video data paths whose input port can be coupled to the output of one of the set of test pattern generators and whose output port can be coupled to the input of one of the set of function calculators.

11. An apparatus as recited in claim 6, wherein the video data path includes an HDMI transmitter, where HDMI refers to High Definition Media Interface, and an HDMI receiver.

12. A tangible computer-readable storage medium configured with instructions that when executed by one or more processors of a processing system cause an apparatus containing the processing system to:
send video data corresponding to a video test pattern to an input port of a video data path, wherein the video data path does not cause the video data to undergo a transform compression or decompression or any other processing that is lossy, lossy processing being processing that would cause at least an active part of the output digital video data at the output port to not be an exact duplicate of the corresponding at least the active part of the sent video data because of losses inherent in processing in the video data path;
receive video data at an output port of the video data path corresponding to the sent video data;
calculate a function of the at least the active part of the received video data, the function selected such that it has a correct value when the at least the active part of the received video data accurately corresponds to the corresponding part of the sent video data, and a value other than the correct value when the at least the active part of the received video differs from the corresponding part of the sent video data; and
ascertain whether the function of the at least the active part of the received video data has the correct value to ascertain whether or not an error has occurred such that the video data path can be tested.

13. An apparatus comprising:
a video decoder having an input accepting compressed video and operative to decode the compressed video to a first digital video format, and an output, the video decoder including a first test pattern generator that is selectable such that the output is selectable between video decompressed from the compressed video input and the output of the first test pattern generator;
a first digital video data path including an input port coupled to the selectable output of the video decoder and an output port;
a video switcher including a first video input port coupled to the output port of the first video data path and having a first video output port, the test pattern generator with an output coupled to the input port of the video data path, the video switcher including a first function calculator with an input selectable to be coupled to the first input port, the first function calculator being operative to calculate a function of at least an active part of video data from the first input port, the video switcher including a second video input port and further including a first video output port, the video switcher operable to switch video between one of the input ports and the output port, the video switcher further including a second test pattern generator that is selectable such that the first output of the video switcher is selectable between one of the input ports of the video switcher and the output of the second test pattern generator;
a first digital video input terminal accepting video in a second digital format;
a second digital video data path including an input port coupled to the input terminal and an output port;
a first video receiver coupled to the output port of the second digital video data path and operative to convert from the second format to the first digital data format, the first video receiver having an output port;
a third digital video data path including an input port coupled to the output port of the first digital video receiver and an output port coupled to the second input port of the video switcher;
a fourth digital video data path including an outout port and an input port coupled to the first output port of the video switcher;
a first video transmitter coupled to the output port of the fourth digital video data path and operative to convert from the first format to a third digital data format, the a first video transmitter having an output port;
a fifth digital video data path including an input port coupled to the output port of the first video transmitter and an output port;
a first digital video output terminal accepting video coupled to the output of the fifth digital video data path;
a video encoder having an input accepting video in the first digital video format and operative to produce compressed video from the video accepted in the input of the video encoder, the video encoder including a second function calculator with an input selectable to be coupled to the input of the video encoder, the second function calculator being selectively operative to calculate a function of the at least the active part of video accepted in the input;
a sixth digital video data path including an input port coupled to an additional output port of the video switcher and an output port coupled to the input of the video encoder,
wherein each respective function calculator is selected to calculate a correct value when the at least the active part of the video data used as input to the respective function calculator accurately corresponds to the corresponding part of video data generated by one of the respective test pattern generators, and a value other than the correct value when the at least the active part of the video data used as input differs from the corresponding part of the video data generated by the respective test pattern generator.

14. An apparatus as recited in claim 13,
wherein the second and third digital video formats are HDMI formats, and
wherein first input terminal is an HDMI terminal, the first transmitter is an HDMI transmitter, the first output terminal is an HDMI output terminal, and the first receiver is an HDMI receiver, where HDMI refers to High Definition Media Interface.

15. An apparatus as recited in claim 13, wherein the first video format is a high definition video format.

16. An apparatus as recited in claim 15, wherein respective test pattern is a high definition video test pattern.

17. An apparatus as recited in claim 13, further comprising:
a memory operative to store the correct value calculated for each respective function calculator; and
a test circuit coupled to each respective function calculator and to the memory configured to ascertain whether the respective function of the at least the active part has the respective correct value.

18. An apparatus as recited in claim 17, wherein the test circuit is operative to ascertain, in the case that an error has occurred, the value of the respective function of the at least the active part of the video data from the output port of the respective video data path, which is used to determine the type of error that has occurred.

19. An apparatus as recited in claim 13, wherein each respective function is a CRC checksum of the active part of the respective video data used to calculate the function.

20. A tangible computer-readable storage medium as recited in claim 12, wherein the video data path is one of a set of one or more video data paths, each having a corresponding input port and output port, the video paths being in the apparatus, the apparatus including at least one of:
a video coder having a video coder input, wherein the output port of one of the set of one or more video data paths in normal operation is coupled to the video coder input and additionally or alternately can be used for the calculating of the function,
a video decoder having a video decoder output that in normal operation is coupled to one of the set of test pattern generators, arranged such that the input port of the video data path whose input is coupled to the video decoder output in normal operation additionally or alternately has sent therein the video data corresponding to the video test pattern,
a video receiver having a video receiver output and being in one of the set of one or more video data paths whose input port can be the input port to which the video data corresponding to the video test pattern is sent, and whose output port output is used for the calculating, and
a video transmitter having a corresponding video transmitter input and being in one of the set of one or more video data paths whose input port can be the input port to which the video data corresponding to the video test pattern is sent, and whose output port output is used for the calculating.

* * * * *